United States Patent [19]
Glanzbergh

[11] Patent Number: 5,748,279
[45] Date of Patent: May 5, 1998

[54] KIT FOR MOMENTARY CORRECTION OF VISION TO AID IN THE SELECTION OF EYEGLASS FRAMES

[76] Inventor: Mitchel Glanzbergh, 5116 Llano Dr., Woodland Hills, Calif. 91364

[21] Appl. No.: 795,254

[22] Filed: Feb. 10, 1997

Related U.S. Application Data

[63] Continuation-in-part of Ser. No. 661,043, Jun. 10, 1996, abandoned.

[51] Int. Cl.$^6$ .................................................. G02C 7/16
[52] U.S. Cl. .................................................. 351/45; 351/46
[58] Field of Search .................................. 351/44, 45, 46, 351/41

[56] References Cited

U.S. PATENT DOCUMENTS 3,628,854  12/1971  Jampolsky .
5,416,537  5/1995  Sadler .

*Primary Examiner*—Hung X. Dang
*Attorney, Agent, or Firm*—Thomas I. Rozsa; Tony D. Chen

[57] ABSTRACT

An inexpensive method and apparatus for modifying the optical characteristics of blank lenses to convert them into regular lens spectacles in order to enable a prospective purchaser of eyeglass frames to fully see himself/herself in the mirror when trying on the frames to be certain as to how they will look when wearing the frames. The present invention relates to an eyeglass frame tester kit which can be used to evaluate a particular frame among others. Correction means are temporarily adhered to the blank lenses of each pair of frames selected. This permits the client to get a more realistic image of how the completed prescription will look because with the corrective ocular means affixed to the blank lenses, the lens functions as a normal lens providing the optical correction required to enable the wearer to see clearly. Therefore, with the corrective means attached to the blank lens, the wearer can clearly see his/her image in the mirror and clearly see how he/she will look when wearing the particular frame. By having the corrective means press fitted and easily peeled off the blank lenses, the prospective purchaser can reuse the same corrective lens means on different lens blanks in different frames to therefore try on a series of different frames one after the other in order to determine which frame best suits that particular purchaser.

19 Claims, 2 Drawing Sheets

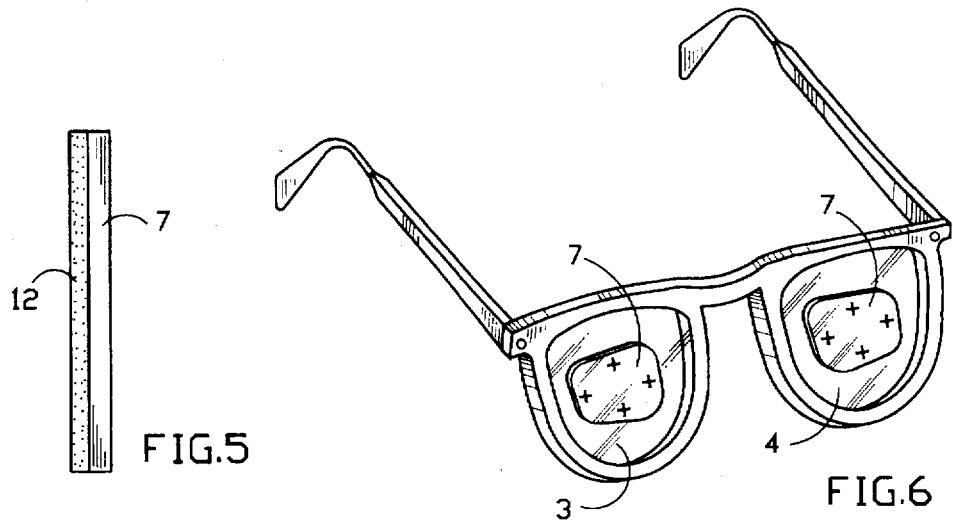
FIG.5
FIG.6
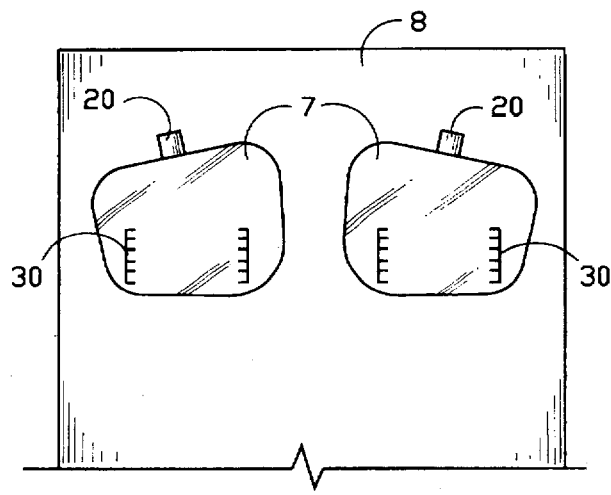
FIG.7
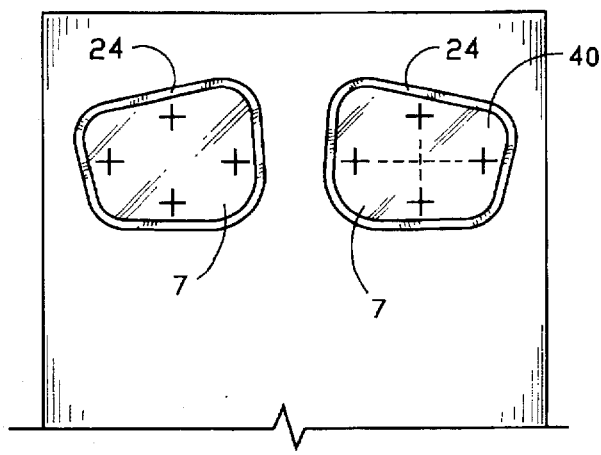
FIG.8

KIT FOR MOMENTARY CORRECTION OF VISION TO AID IN THE SELECTION OF EYEGLASS FRAMES

This application is a Continuation-In-Part of patent application Ser. No. 08/661,043, filed on Jun. 10, 1996, now abandoned.

BACKGROUND OF THE INVENTION

1. Field of the Invention

The present invention relates to the field of eyeglasses. More particularly, the present invention relates to the field of devices which assist a customer to properly select a frame for a new pair of eyeglasses.

2. Description of the Prior Art

The present invention relates to an eyeglass frame tester kit which can be used to evaluate a particular frame among several others. Frames are generally chosen from a collection of blank units mounted in a display rack. When they are donned by a prospective purchaser and inspected in a mirror, he or she cannot judge how the frame will really look when the proper lenses are in place because the prospective purchaser's vision is not suitably adjusted to clearly view his or her image in the mirror. As a result, the selection of a suitable frame becomes a matter of guesswork because it is impractical to edge grind and install lenses into each frame which the prospective purchaser is considering.

When frames are presently received from a manufacturer, they are equipped with blank lenses to impart rigidity and prevent bending or other distortion during shipping and during handling in the oculist's shop. The blank lenses are constructed of transparent plastic.

The following two (2) prior art patents are found to be pertinent to the field of the present invention:

1. U.S. Pat. No. 3,628,854 issued to Jampolsky on Dec. 21, 1971 for "Flexible Fresnel Refracting Membrane Adhered To Ophthalmic Lens" (hereafter the "Jampolsky Patent").

2. U.S. Pat. No. 5,416,537 issued to Sadler on May 16, 1995 for "Magnetic Means For Securing Auxiliary Lenses To Eyeglasses" (hereafter the "Sadler Patent").

The Jampolsky Patent discloses a method for treating various eye conditions using temporarily modified magnifying and refracting elements. Jampolsky uses an electrostatic force for adhesion of an auxiliary lens to a prescription lens for therapeutic purposes. In Jampolsky, the entire prescription lens is covered by the attached lens. Therefore, considerable care in alignment is necessary or otherwise eyestrain of the wearer may occur. It is a primary purpose of the Jampolsky Patent to provide a means for modifying the optical characteristics of ophthalmic lenses through use of a thin flexible film which is pressed onto the spectacle lens and is designed to be worn for use until a replacement thin film lens is substituted for the initial one. The specific purpose of the thin film lens disclosed in the Jampolsky Patent is for a one time use with a specific ophthalmic lens of a specific wearer for use over a period of time. The lens must be properly fitted to the specific spectacle configuration and the fitting must be performed by one skilled in the ophthalmic arts to assure proper alignment of the added thin film onto the existing spectacle lens. The entire purpose and function of the thin-film press on lens in the Jampolsky Patent is different from the present invention. The Jampolsky Patent does not teach or suggest adding a correction lens to a blank lens for the purpose of enabling the customer to properly view himself or herself in a mirror so that the customer can clearly see how he or she looks with the particular spectacle or eyeglass frame chosen. In addition, the Jampolsky Patent does not teach the concept of reusing the same thin film lens over and over again with different spectacles for different wearers so that different wearers can reuse the same thin film lens when determining which frame they wish to purchase. In addition, it would be too expensive to cut the lens to fit every frame.

The Sadler patent discloses an eyeglass device which includes frames adapted for fitting on and being supported by a human wearer's head. Primary lenses are set within the frames and have an external shape. The eyeglass device also has auxiliary lenses which have an external shape which generally corresponds to the external shape of the primary lenses. First magnetic members are attached to the frames, and second magnetic members are attached to the auxiliary lenses in positions which correspond to the positions of the first magnetic members in their frames. The second magnetic members are arranged for engagement with the first magnetic members to thereby secure the auxiliary lenses to the eyeglasses. The Sadler Patent discloses rapid means for adding auxiliary lenses and filters (such as sun shading devices) to a pair of eyeglasses. Although the magnetic means are suitable for rapid attachment, it would be too expensive for the present invention's purpose of simple, momentary correction of vision to aid in the selection of a frame since utilizing the Sadler invention for the present invention's purposes would require adding magnetically susceptible materials to each existing frame by the manufacturer. These materials might also interfere with style parameters required in certain frames.

It is therefore desirable to have a simple and inexpensive method and apparatus for assisting a customer to properly select a frame for a new pair of eyeglasses.

SUMMARY OF THE INVENTION

The present invention is an inexpensive method and apparatus for modifying the optical characteristics of blank lenses to convert them into regular lens spectacles in order to enable a prospective purchaser of eyeglass frames to fully see himself/herself in the mirror when trying on the frames to be certain as to how they will look when wearing the frames. The present invention relates to an eyeglass frame tester kit which can be used to evaluate a particular frame among others. Eyeglass frames are generally chosen from a collection of blank units mounted in a display rack. When a prospective purchaser puts on a standard frame with conventional blank lenses, they are unable to accurately see themselves in the mirror. The reason they are purchasing glasses is to correct a defect in their vision. By looking at themselves through plain blank lenses, the required correction in their vision remains unchanged. Therefore, they cannot accurately view themselves in the mirror through the use of eyeglass frames with plain standard blank lenses. The selection of a suitable frame therefore becomes a matter of guesswork because it is impractical to edge grind and install lenses into each frame which is being considered.

When frames are presently received from a manufacturer, they are equipped with blank lenses to impart rigidity and prevent bending or other distortion during shipping and during handling in the oculist's shop. The transparent forms are not ophthalmic lenses and in fact it is illegal to use these blank forms as ophthalmic lenses. The blank lenses are constructed of transparent plastic to which a number of materials can be attached on a short term basis. In carrying out the present invention, correction means are temporarily adhered to the blank lenses of each pair of frames selected. This permits the client to get a more realistic image of how the completed prescription will look because with the corrective ocular means affixed to the blank lenses, the lens functions as a normal lens providing the optical correction required to enable the wearer to see clearly. Therefore, with the corrective means attached to the blank lens, the wearer can clearly see his/her image in the mirror and clearly see how he/she will look when wearing the particular frame. By having the corrective means press fitted and easily peeled off the blank lenses, the prospective purchaser can reuse the same corrective lens means on different lens blanks in different frames to therefore try on a series of different frames one after the other in order to determine which frame best suits that particular purchaser. By having the corrective lens means affixed to each such lens blank and also refitted to a previously tried frame to get a second look, the prospective purchaser can clearly see his/her image in the mirror on all of the frames in order to determine which frame best suits him/her. This permits the prospective purchaser to get a more realistic image of how the completed prescription will look. He or she can then better evaluate several frames in terms of overall appearance as well as fit and overall comfort. After use, the stick on lenses and other optical devices can be returned to a storage sheet after each frame fitting and be used for a considerable number of clients. Therefore, the corrective means can be used and reused over and over again.

It is therefore an object of the present invention to provide a method and apparatus to enable a purchaser to try on different eyeglass frames with blank stock lenses and temporarily modify the blank lenses to convert them to spectacle lenses with corrective optics designed to accommodate the specific wearer in order to enable the purchaser to accurately see himself/herself in the mirror in order to determine which frame best suits the purchaser.

It is another object of the present invention to provide a method and apparatus for temporarily and reusably modifying the optical characteristics of blank stock lenses of eyeglass frames by pressing onto at least a portion of at least one surface of the blank stock lenses a suitable thin flexible film which thereby temporarily converts the blank lens into a spectacle lens with the appropriate corrective optics to accommodate the wearer.

It is a further object of the present invention to provide a method and apparatus for temporarily and reusably modifying the optical characteristics of blank stock lenses of eyeglass frames by pressing onto at least a portion of at least one surface of the blank stock lenses a suitable thin flexible film which thereby temporarily converts the blank lens into a spectacle lens having the optical characteristics of an ophthalmic corrective lens, such as a fresnel lens, an aspheric lens or a progressive lens.

It is an additional object of the present invention to provide corrective means to convert the optical characteristics of blank stock lenses on eyeglass frames into a spectacle lens with the appropriate corrective optics to accommodate the wearer which can be applied to either the front or the back surface of the stock lens or to both surfaces of the stock lens.

It is another object of the present invention to provide corrective means to convert the optical characteristics of blank stock lenses on eyeglass frames into a spectacle lens with the appropriate corrective optics to accommodate the wearer which are reusable and can be used by the same user over and over again to try on different frames with stock lenses and subsequently can be used by a different user.

It is another object of the present invention to provide corrective means to convert the optical characteristics of blank stock lenses on eyeglass frames into a spectacle lens with the appropriate corrective optics to accommodate the wearer which include means to facilitate the removal of corrective means from the stock lens and reapplying it onto another stock lens.

It is another object of the present invention to provide corrective means to convert the optical characteristics of blank stock lenses on eyeglass frames into a spectacle lens with the appropriate corrective optics to accommodate the wearer which can be performed rapidly and inexpensively and make it possible for the purchaser to evaluate a relatively large number of frames.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 5 is a side view of a corrective device with reusable adhesive affixed to one side.

FIG. 6 is a perspective view of eyeglasses with the corrective device removably affixed to each stock blank lens.

FIG. 7 is a top plan view of a flexible sheet holding a pair of flexible corrective devices with a removal and affixing tab attached to each corrective device.

FIG. 8 is a top plan view of a flexible sheet holding a pair of flexible corrective devices with a removal and affixing rim attached to the circumference of each corrective device.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
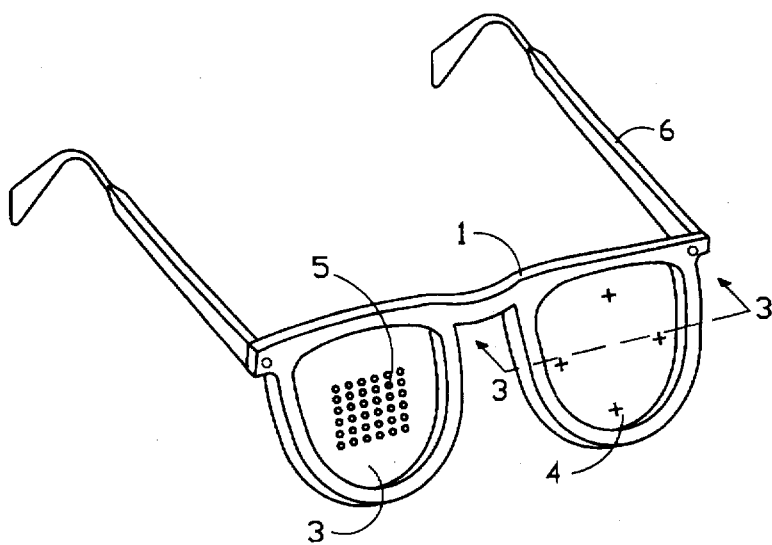
FIG. 1 is a perspective view of an eyeglass frame containing blank lenses to which an embossed correcting lens and a pin hole array have been attached.

Referring to FIG. 1, there is shown at 1 a typical eyeglass frame which can be used for eyeglasses or sunglasses. The eyeglass frame 1 contains a pair of standard blank lenses 3 and 4 respectively, which come with the eyeglass frame and are used to impart rigidity and prevent bending or other distortion during shipping and during handling in the oculist's shop. The blank lenses 3 and 4 are typically constructed of transparent plastic and do not have any optical characteristics which modify the wearer's vision.

When an eye examination is completed, the optometrist knows the type of correction required for each eye and a specific corrective lens for each eye is prescribed to correct the person's vision. The present invention comprises a multiplicity of corrective devices which are capable of being removably affixed to a portion of at least one surface of each blank lens 3 and 4 in order to modify the blank stock lenses 3 and 4 which impart no corrective vision into temporary spectacles with the corrective optics for each eye so the wearer can clearly see in a mirror how he/she will look when wearing the specific frame.

Figure 3:
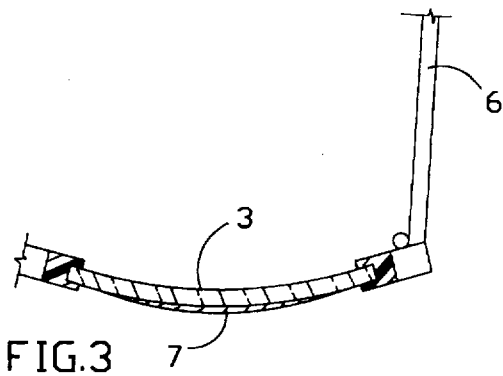
FIG. 3 is a cross-sectional view taken along line 3—3 of FIG. 1, showing a blank lens to which a corrective lens has been attached.
Figure 4:
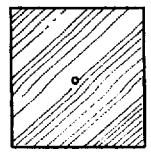
FIG. 4 illustrates one method of constructing a single pin hole element in which a photographically occluded surface contains a small, circular, sharp-edged and transparent area.
Figure 2:
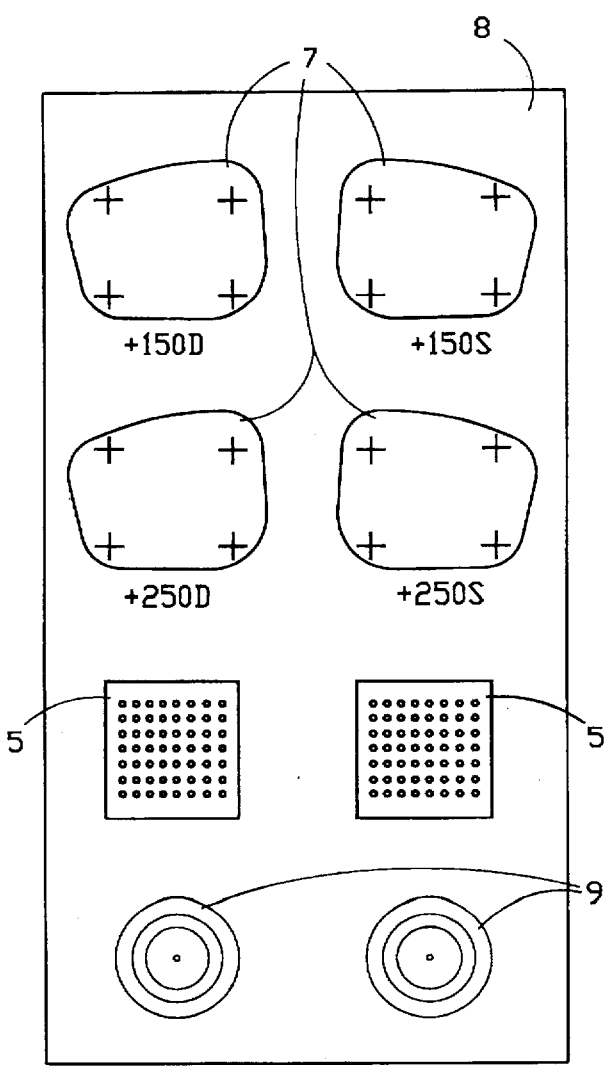
FIG. 2 is a top plan view of a flexible sheet holding pairs of flexible corrective devices ready for peeling and reattaching to the blank lenses of eyeglass frames. The devices include embossed spherical lenses, pin hole arrays, single pin holes, fresnel lenses, aspheric lenses, progressive lenses, prisms and other optical corrective elements.

Referring to FIG. 2, there is illustrated at 8 one type of flat plastic storage sheet onto which the corrective devices of the present invention are removably placed. The corrective devices can be comprised of various types of corrective lenses 7 which by way of example can be spherical lenses, fresnel lenses, aspheric lenses or progressive lenses. The corrective device lenses 7 have various marked adopter, refractive powers, and other standard optical corrective means. By way of example, the corrective devices 7 can be a thin film onto which is embossed the appropriate optical corrective means or it can have small lenses attached to a flexible carrier so that it can adhere to the blank lens. The present invention envisions a "set" of corrective devices 7 removably attached to a sheet 8 which set comprises the complete series of optical corrective characteristics to match the various optical characteristics examined by the optometrist's machine when performing the eye examination. The pair of corrective devices 7 will have marked on the device or immediately adjacent the device what it's optical corrective characteristics are. In this way, after the eye examination is performed and the specific correction for each eye is known, the optometrist or lab technician selects the appropriate corrective device from the set and removably applies it to a portion of one surface of the blank lens which will be aligned with that particular eye when the frame is worn. The corrective devices 7 will have means for removably affixing them to a portion of the surface of the blank lens. As illustrated in FIG. 3, the corrective device 7 is removably affixed to the front surface of blank stock lens 3. It is emphasized that it is also within the spirit and scope of the present invention for the corrective device to be removably affixed to the rear surface of the stock blank lens or to both surfaces. The corrective device can have the corrective vision optics incorporated into it by any means well known in the art such as embossing, molding, etc. The corrective device 7 can also be constructed of any means known in the art such as thin film.

An important feature of the present invention corrective device 7 is that it does not have to cover the entire surface of blank stock lens 3 and 4 but instead only needs to cover a portion of the surface of blank stock lens 3 and 4 so that the corrective device is aligned with the wearer's eye when the frame 1 is worn so that the wearer can see through the blank stock lens as modified by the corrective device 7 to view himself/herself in the mirror. Therefore, the corrective device 7 can be of any shape such as square, round, oval, rectangular, or random shape as illustrated in FIG. 2. The corrective device 7 also contains on its surface removable adhesive means 12, as illustrated in FIG. 5. The removable adhesive means 12 may be reusable adhesive comparable to that used on a Post-it® note pad. It is also not necessary that the corrective device be exactly centered on the stock lens. Therefore, as illustrated in FIG. 6, the corrective device 7 can be applied to the stock lenses 3 and 4 by the consumer as well as the lab technician and can be rapidly removed and reaffixed to the stock lenses of the next frame to be tried on. Through use of the present invention, the consumer can apply the corrective device over and over again, removing it from the lenses of one frame, applying it to the lenses of another frame, and then going back to the first frame or to a third or fourth frame.

The corrective device can also be pin-hole arrays 5 as illustrated in FIG. 2 or fresnel lenses 9 as also illustrated in FIG. 2. By way of example, the corrective devices 5, 7 and 9 as illustrated in FIG. 2 may be molded from sheet plastic, embossed onto the plastic, or printed on a plastic sheet in the case of the pin-hole arrays. The lenses of the corrective devices may be spherical, cylindrical, reading-addition type, fresnel, aspheric, progressive, or various combinations. When an eye examination is completed and the required correction for each eye is known, the optometrist or a laboratory technician selects a pair or corrective devices for the right eye and the left eye lenses which are approximately correct, removes them from the sheet 8, and temporarily attaches them to the blank lenses of the first frame chosen by the patient. The patient can then get a fairly accurate estimation of how that frame will look when the patient views himself/herself in the mirror. The temporary lenses can be easily transferred from the first frame to as many other frames as the patient has selected to try on. To facilitate this process, each corrective device may be supplied with a removal and affixing means 20 as illustrated in FIGS. 7 and 8. One type of removal and affixing means is a tab 20 affixed to a portion of each corrective device. Another type of removal and affixing means is a rim 24 (see FIG. 8) on the circumference or a portion of the circumference of the corrective device 7. The corrective device 7 can therefore be more easily removed from the sheet 8 by grabbing the tab or rim and pulling and this tab or rim can also be used to affix the corrective device to the next stock lens.

In addition, to facilitate proper placement of the lenses and to facilitate proper procurement of the location of the permanent ophthalmic lens, the corrective device 7 may also include a measuring scale 30 (see FIG. 7) which allows the technician to measure the correct placement for a permanent lens on the eyeglass frame in relationship to the wearer.

In addition, the corrective device 7 may include crosshairs 40 (see FIG. 8) to enable the technician to obtain the optical center of the device so that it can be properly placed on the lens in front of the wearer's eye.

In addition to adhesive means 12, the corrective device 7 which by way of example can be a plastic lens or thin film can be made of material which includes electrostatic adhesion properties so that it can be adhered to the blank lens by a static electrical charge induced for example by rubbing which therefore creates electrostatic coupling. Also, the corrective device 7 can be adhered to the blank lens by having the corrective device 7 made of material which can be adhered to the blank lens by capillary attraction coupling means. Adhesion can also be made by the use of a number of contact cements (such as 12 illustrated in FIG. 5) which permit frequent re-use. Another possibility is to create a vacuum between the blank lens surface and the corrective device surface. It is also within the spirit and scope of the present invention to include the method of attaching as cementing the temporary lenses to a surface which in turn has removable adhesive which can be applied to the blank lenses and therefore, the lens film itself does not come directly in contact with the lens surface but is instead sandwiched between the removable attaching means and the lens surface. The combination of the lens and the removable attaching surface can be considered to be an attaching means.

Through use of the present invention both eyes may have the same correction or there can be a different correction for each respective eye.

Defined in detail, the present invention is an apparatus for use in conjunction with multiple pairs of eyeglasses to be tested by a wearer, each pair of the eyeglasses including a first blank lens and a second blank lens so that the first blank lens is in front of a first eye of the wearer and the second blank lens is in front of a second eye of the wearer when the pair of eyeglasses are worn by the wearer, the apparatus comprising: (a) a first corrective device for correcting the vision of the first eye of the wearer, the first corrective device formed of thin film having a first surface, a second surface, and a circumference with a reusable adhesive affixed to the first surface and a removal and affixing means attached to at least a portion of the circumference the first corrective device, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer; (b) a second corrective device for correcting the vision of the second eye of the wearer, the second corrective device formed of thin film having a first surface, a second surface, and a circumference with a reusable adhesive affixed to the first surface and a removal and affixing means attached to at least a portion of the circumference the second corrective device, the size of the second corrective device being less than the size of the second blank lens of each of the multiplicity of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and (c) the first corrective device being rapidly removable from the first blank lens of said selected pair of eyeglasses through the removal and affixing means and rapidly removably attachable to a portion of the first blank lens of another pair of eyeglasses, and the second corrective device being rapidly removable from the second blank lens of said selected pair of eyeglasses through the removal and affixing means and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

Defined broadly, the present invention is an apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising: (a) a first corrective device for correcting the vision of the first eye of the wearer, the first corrective device having a first surface, a second surface, and a circumference with a reusable attaching means incorporated into the first surface and a removal and affixing means attached to at least a portion of the circumference the first corrective device, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer; (b) a second corrective device for correcting the vision of the second eye of the wearer, the second corrective device having a first surface, a second surface, and a circumference with a reusable attaching means incorporated into the first surface and a removal and affixing means attached to at least a portion of the circumference the second corrective device, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and (c) the first corrective device being rapidly removable from the first blank lens of said selected pair of eyeglasses through the removal and affixing means and rapidly removably attachable to a portion of the first blank lens of another pair of eyeglasses, and the second corrective device being rapidly removable from the second blank lens of said selected pair of eyeglasses through the removal and affixing means and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

Defined more broadly, the present invention is an apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising: (a) a first corrective device for correcting the vision of the first eye of the wearer, the first corrective device having a first surface and a second surface, with a reusable attaching means on the first surface, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer; (b) a second corrective device for correcting the vision of the second eye of the wearer, the second corrective device having a first surface and a second surface, with a reusable attaching means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and (c) the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

Defined even more broadly, the present invention is an apparatus for use in conjunction with multiple pairs of eyeglasses to be tested by a wearer, each pair of the eyeglasses including a first blank lens and a second blank lens so that the first blank lens is in front of a first eye of the wearer and the second blank lens is in front of a second eye of the wearer when the pair of eyeglasses are worn by the wearer, the apparatus comprising: (a) a multiplicity of pairs of corrective devices, each pair of corrective devices having identical vision correcting means to correct the vision of the eyes of the wearer; (b) a first corrective device selected from one of said multiplicity of pairs of corrective devices for correcting the vision of the first eye of the wearer, the first corrective device formed of thin film having a first surface, a second surface, and a circumference with a reusable adhesive affixed to the first surface and a removal and affixing means attached to at least a portion of the circumference the first corrective device, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer; (c) a second corrective device selected from either said one or another pair of said multiplicity of pairs of corrective devices for correcting the vision of the second eye of the wearer, the second corrective device formed of thin film having a first surface, a second surface, and a circumference with a reusable adhesive affixed to the first surface and a removal and affixing means attached to at least a portion of the circumference the second corrective device, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and (d) the first corrective device being rapidly removable from the first blank lens of said selected pair of eyeglasses through the removal and affixing means and rapidly removably attachable to a portion of the first blank lens of another pair of eyeglasses, and the second corrective device being rapidly removable from the second blank lens of said selected pair of eyeglasses through the removal and affixing means and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

Defined further more broadly, the present invention is an apparatus for use in conjunction with multiple pairs of eyeglasses to be tested by a wearer, each pair of the eyeglasses including a first blank lens and a second blank lens so that the first blank lens is in front of a first eye of the wearer and the second blank lens is in front of a second eye of the wearer when the pair of eyeglasses are worn by the wearer, the apparatus comprising: (a) a multiplicity of pairs of corrective devices, each pair of corrective devices having identical vision correcting means to correct the vision of the eyes of the wearer; (b) a first corrective device selected from one of said multiplicity of pairs of corrective devices for correcting the vision of the first eye of the wearer, the first corrective device having a first surface, a second surface, and a circumference with a reusable attaching means incorporated into the first surface and a removal and affixing means attached to at least a portion of the circumference the first corrective device, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer; (c) a second corrective device selected from either said one or another pair of said multiplicity of pairs of corrective devices for correcting the vision of the second eye of the wearer, the second corrective device having a first surface, a second surface, and a circumference with a reusable attaching means incorporated into the first surface and a removal and affixing means attached to at least a portion of the circumference the second corrective device, the size of the second corrective device being less than the size of the second blank lens of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and (d) the first corrective device being rapidly removable from the first blank lens of said selected pair of eyeglasses through the removal and affixing means and rapidly removably attachable to a portion of the first blank lens of another pair of eyeglasses, and the second corrective device being rapidly removable from the second blank lens of said selected pair of eyeglasses through the removal and affixing means and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

Defined also further more broadly, the present invention is an apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising: (a) a multiplicity of pairs of corrective devices, each pair of corrective device having identical vision correcting means to correct the vision of the eyes of the wearer; (b) a first corrective device selected from one of said multiplicity of pairs of corrective devices for correcting the vision of the first eye of the wearer, the first corrective device having a first surface and a second surface, with a reusable attaching means on the first surface, the size of the first corrective device being less than the size of the first blank lens of each of said multiple pairs of eyeglasses, the first corrective device removably attached at its first surface to a portion of a surface of the first blank lens of a selected pair of eyeglasses so that the wearer will see through the first blank lens and the first corrective device when the selected pair of eyeglasses are worn by the wearer; (c) a second corrective device selected from either said one or another pair of said multiplicity of pairs of corrective devices for correcting the vision of the second eye of the wearer, the second corrective device having a first surface and a second surface, with a reusable attaching means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; (d) the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

Defined again further more broadly, the present invention is an apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising: (a) a first corrective device for correcting the vision of the first eye of the wearer, the first corrective device having a first surface and a second surface, with electrostatic coupling means on the first surface, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer; (b) a second corrective device for correcting the vision of the second eye of the wearer, the second corrective device having a first surface and a second surface, with electrostatic coupling means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and (c) the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

Defined even further more broadly, the present invention is an apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising: (a) a first corrective device for correcting the vision of the first eye of the wearer, the first corrective device having a first surface and a second surface, with capillary attraction coupling means on the first surface, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer; (b) a second corrective device for correcting the vision of the second eye of the wearer, the second corrective device having a first surface and a second surface, with capillary attraction coupling means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and (c) the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

Defined also even further more broadly, the present invention is an apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising: (a) a multiplicity of pairs of corrective devices, each pair of corrective device having identical vision correcting means to correct the vision of the eyes of the wearer; (b) a first corrective device selected from one of said multiplicity of pairs of corrective devices for correcting the vision of the first eye of the wearer, the first corrective device having a first surface and a second surface, with electrostatic coupling means on the first surface, the size of the first corrective device being less than the size of the first blank lens of each of said multiple pairs of eyeglasses, the first corrective device removably attached at its first surface to a portion of a surface of the first blank lens of a selected pair of eyeglasses so that the wearer will see through the first blank lens and the first corrective device when the selected pair of eyeglasses are worn by the wearer; (c) a second corrective device selected from either said one or another pair of said multiplicity of pairs of corrective devices for correcting the vision of the second eye of the wearer, the second corrective device having a first surface and a second surface, with electrostatic coupling means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and (d) the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

Defined again even further more broadly, the present invention is an apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising: (a) a multiplicity of pairs of corrective devices, each pair of corrective device having identical vision correcting means to correct the vision of the eyes of the wearer; (b) a first corrective device selected from one of said multiplicity of pairs of corrective devices for correcting the vision of the first eye of the wearer, the first corrective device having a first surface and a second surface, with capillary attraction coupling means on the first surface, the size of the first corrective device being less than the size of the first blank lens of each of said multiple pairs of eyeglasses, the first corrective device removably attached at its first surface to a portion of a surface of the first blank lens of a selected pair of eyeglasses so that the wearer will see through the first blank lens and the first corrective device when the selected pair of eyeglasses are worn by the wearer; (c) a second corrective device selected from either said one or another pair of said multiplicity of pairs of corrective devices for correcting the vision of the second eye of the wearer, the second corrective device having a first surface and a second surface, with capillary attraction coupling means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and (d) the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An apparatus for use in conjunction with multiple pairs of eyeglasses to be tested by a wearer, each pair of the eyeglasses including a first blank lens and a second blank lens so that the first blank lens is in front of a first eye of the wearer and the second blank lens is in front of a second eye of the wearer when the pair of eyeglasses are worn by the wearer, the apparatus comprising:

a. a first corrective device for correcting the vision of the first eye of the wearer, the first corrective device formed of thin film having a first surface, a second surface, and a circumference with a reusable adhesive affixed to the first surface and a removal and affixing means attached to at least a portion of the circumference the first corrective device, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer;

b. a second corrective device for correcting the vision of the second eye of the wearer, the second corrective device formed of thin film having a first surface, a second surface, and a circumference with a reusable adhesive affixed to the first surface and a removal and affixing means attached to at least a portion of the circumference the second corrective device, the size of the second corrective device being less than the size of the second blank lens of each of the multiplicity of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and c. the first corrective device being rapidly removable from the first blank lens of said selected pair of eyeglasses through the removal and affixing means and rapidly removably attachable to a portion of the first blank lens of another pair of eyeglasses, and the second corrective device being rapidly removable from the second blank lens of said selected pair of eyeglasses through the removal and affixing means and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

2. An apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising:

a. a first corrective device for correcting the vision of the first eye of the wearer, the first corrective device having a first surface, a second surface, and a circumference with a reusable attaching means incorporated into the first surface and a removal and affixing means attached to at least a portion of the circumference the first corrective device, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer;

b. a second corrective device for correcting the vision of the second eye of the wearer, the second corrective device having a first surface, a second surface, and a circumference with a reusable attaching means incorporated into the first surface and a removal and affixing means attached to at least a portion of the circumference the second corrective device, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and c. the first corrective device being rapidly removable from the first blank lens of said selected pair of eyeglasses through the removal and affixing means and rapidly removably attachable to a portion of the first blank lens of another pair of eyeglasses, and the second corrective device being rapidly removable from the second blank lens of said selected pair of eyeglasses through the removal and affixing means and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

3. An apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising:

a. a first corrective device for correcting the vision of the first eye of the wearer, the first corrective device having a first surface and a second surface, with a reusable attaching means on the first surface, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer;

b. a second corrective device for correcting the vision of the second eye of the wearer, the second corrective device having a first surface and a second surface, with a reusable attaching means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and c. the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

4. An apparatus for use in conjunction with multiple pairs of eyeglasses to be tested by a wearer, each pair of the eyeglasses including a first blank lens and a second blank lens so that the first blank lens is in front of a first eye of the wearer and the second blank lens is in front of a second eye of the wearer when the pair of eyeglasses are worn by the wearer, the apparatus comprising:

a. a multiplicity of pairs of corrective devices, each pair of corrective devices having identical vision correcting means to correct the vision of the eyes of the wearer;

b. a first corrective device selected from one of said multiplicity of pairs of corrective devices for correcting the vision of the first eye of the wearer, the first corrective device formed of thin film having a first surface, a second surface, and a circumference with a reusable adhesive affixed to the first surface and a removal and affixing means attached to at least a portion of the circumference the first corrective device, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer;

c. a second corrective device selected from either said one or another pair of said multiplicity of pairs of corrective devices for correcting the vision of the second eye of the wearer, the second corrective device formed of thin film having a first surface, a second surface, and a circumference with a reusable adhesive affixed to the first surface and a removal and affixing means attached to at least a portion of the circumference the second corrective device, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and d. the first corrective device being rapidly removable from the first blank lens of said selected pair of eyeglasses through the removal and affixing means and rapidly removably attachable to a portion of the first blank lens of another pair of eyeglasses, and the second corrective device being rapidly removable from the second blank lens of said selected pair of eyeglasses through the removal and affixing means and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

5. An apparatus for use in conjunction with multiple pairs of eyeglasses to be tested by a wearer, each pair of the eyeglasses including a first blank lens and a second blank lens so that the first blank lens is in front of a first eye of the wearer and the second blank lens is in front of a second eye of the wearer when the pair of eyeglasses are worn by the wearer, the apparatus comprising:

a. a multiplicity of pairs of corrective devices, each pair of corrective devices having identical vision correcting means to correct the vision of the eyes of the wearer;
  b. a first corrective device selected from one of said multiplicity of pairs of corrective devices for correcting the vision of the first eye of the wearer, the first corrective device having a first surface, a second surface, and a circumference with a reusable attaching means incorporated into the first surface and a removal and affixing means attached to at least a portion of the circumference the first corrective device, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer;
  c. a second corrective device selected from either said one or another pair of said multiplicity of pairs of corrective devices for correcting the vision of the second eye of the wearer, the second corrective device having a first surface, a second surface, and a circumference with a reusable attaching means incorporated into the first surface and a removal and affixing means attached to at least a portion of the circumference the second corrective device, the size of the second corrective device being less than the size of the second blank lens of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and
  d. the first corrective device being rapidly removable from the first blank lens of said selected pair of eyeglasses through the removal and affixing means and rapidly removably attachable to a portion of the first blank lens of another pair of eyeglasses, and the second corrective device being rapidly removable from the second blank lens of said selected pair of eyeglasses through the removal and affixing means and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

6. An apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising:

a. a multiplicity of pairs of corrective devices, each pair of corrective device having identical vision correcting means to correct the vision of the eyes of the wearer;
  b. a first corrective device selected from one of said multiplicity of pairs of corrective devices for correcting the vision of the first eye of the wearer, the first corrective device having a first surface and a second surface, with a reusable attaching means on the first surface, the size of the first corrective device being less than the size of the first blank lens of each of said multiple pairs of eyeglasses, the first corrective device removably attached at its first surface to a portion of a surface of the first blank lens of a selected pair of eyeglasses so that the wearer will see through the first blank lens and the first corrective device when the selected pair of eyeglasses are worn by the wearer;
  c. a second corrective device selected from either said one or another pair of said multiplicity of pairs of corrective devices for correcting the vision of the second eye of the wearer, the second corrective device having a first surface and a second surface, with a reusable attaching means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and
  d. the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

7. An apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising:

a. a first corrective device for correcting the vision of the first eye of the wearer, the first corrective device having a first surface and a second surface, with electrostatic coupling means on the first surface, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer;

b. a second corrective device for correcting the vision of the second eye of the wearer, the second corrective device having a first surface and a second surface, with electrostatic coupling means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and c. the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

8. An apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising:

a. a first corrective device for correcting the vision of the first eye of the wearer, the first corrective device having a first surface and a second surface, with capillary attraction coupling means on the first surface, the size of the first corrective device being less than the size of the first blank lens of each of said multiple pairs of eyeglasses, the first corrective device removably attachable at its first surface to a portion of a surface of the first blank lens of a selected pair of eyeglasses so that the wearer will see through the first blank lens and the first corrective device when the selected pair of eyeglasses are worn by the wearer;

b. a second corrective device for correcting the vision of the second eye of the wearer, the second corrective device having a first surface and a second surface, with capillary attraction coupling means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and c. the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

9. An apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising:

a. a multiplicity of pairs of corrective devices, each pair of corrective device having identical vision correcting means to correct the vision of the eyes of the wearer;

b. a first corrective device selected from one of said multiplicity of pairs of corrective devices for correcting the vision of the first eye of the wearer, the first corrective device having a first surface and a second surface, with electrostatic coupling means on the first surface, the size of the first corrective device being less than the size of the first blank lens of each of said multiple pairs of eyeglasses, the first corrective device removably attached at its first surface to a portion of a surface of the first blank lens of a selected pair of eyeglasses so that the wearer will see through the first blank lens and the first corrective device when the selected pair of eyeglasses are worn by the wearer;

c. a second corrective device selected from either said one or another pair of said multiplicity of pairs of corrective devices for correcting the vision of the second eye of the wearer, the second corrective device having a first surface and a second surface, with electrostatic coupling means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and d. the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

10. An apparatus for use in conjunction with multiple pairs of eyeglasses to be tested by a wearer, each pair of eyeglasses including a first blank lens and a second blank lens so that the first blank lens is in front of a first eye of the wearer and the second blank lens is in front of a second eye of the wearer when the pair of eyeglasses are worn by the wearer, the apparatus comprising:

a. a multiplicity of pairs of corrective devices, each pair of corrective device having identical vision correcting means to correct the vision of the eyes of the wearer;

b. a first corrective device selected from one of said multiplicity of pairs of corrective devices for correcting the vision of the first eye of the wearer, the first corrective device having a first surface and a second surface, with capillary attraction coupling means on the first surface, the size of the first corrective device being less than the size of the first blank lens of each of said multiple pairs of eyeglasses, the first corrective device removably attached at its first surface to a portion of a surface of the first blank lens of a selected pair of eyeglasses so that the wearer will see through the first blank lens and the first corrective device when the selected pair of eyeglasses are worn by the wearer;

c. a second corrective device selected from either said one or another pair of said multiplicity of pairs of corrective devices for correcting the vision of the second eye of the wearer, the second corrective device having a first surface and a second surface, with capillary attraction coupling means on the first surface, the size of the second corrective device being less than the size of the second blank lens of each of said multiple pairs of eyeglasses, the second corrective device removably attachable at its first surface to a portion of a surface of the second blank lens of said selected pair of eyeglasses so that the wearer will see through the second blank lens and the second corrective device when said selected pair of eyeglasses are worn by the wearer; and d. the first corrective device being rapidly removable from the first blank lens of said selected pair of eyeglasses and rapidly removably attachable to a portion of the first blank lens of another pair of eyeglasses, and the second corrective device being rapidly removable from the second blank lens of said selected pair of eyeglasses and rapidly removably attachable to a portion of the second blank lens of the other pair of eyeglasses so that the wearer will see through the first blank lens and the first corrective device and the second blank lens and the second corrective device when the other pair of eyeglasses are worn by the wearer.

11. The apparatus in accordance with claims 1, 2, 3, 4, 5, 6, 7, 8, 9, or 10 wherein the first corrective device and the second corrective device are each fresnel lenses.

12. The apparatus in accordance with claims 1, 2, 3, 4, 5, 6, 7, 8, 9, or 10 wherein the first corrective device and the second corrective device are each aspheric lenses.

13. The apparatus in accordance with claims 1, 2, 3, 4, 5, 6, 7, 8, 9, or 10 wherein the first corrective device and the second corrective device are each progressive lenses.

14. The apparatus in accordance with claims 1, 2, 4, or 5 wherein the removal and affixing means is a tab.

15. The apparatus in accordance with claims 1, 2, 4 or 5 wherein the removal and affixing means is a rim.

16. The apparatus in accordance with claims 1, 2, 3, 4, 5, 6, 7, 8, 9, or 10 wherein the first corrective device and the second corrective device are each respectively attached to a front surface of a blank lens.

17. The apparatus in accordance with claims 1, 2, 3, 4, 5, 6, 7, 8, 9, or 10 wherein the first corrective device and the second corrective device are each respectively attached to a back surface of a blank lens.

18. The apparatus in accordance with claims 1, 2, 3, 4, 5, 6, 7, 8, 9, or 10 wherein said corrective device further comprises a measuring scale.

19. The apparatus in accordance with claims 1, 2, 3, 4, 5, 6, 7, 8, 9, or 10 wherein said corrective device further comprises cross-hairs to obtain the optical center of the device.

* * * * *